US008645531B2

(12) United States Patent
Adams et al.

(10) Patent No.: US 8,645,531 B2
(45) Date of Patent: Feb. 4, 2014

(54) METHOD AND APPARATUS FOR HOME NETWORK ACCESS BY A TRUSTED MONITORING AGENT

(75) Inventors: Corey F. Adams, Frisco, TX (US); Michael J. Brehm, Allen, TX (US)

(73) Assignee: Alcatel Lucent, Paris (FR)

( * ) Notice: Subject to any disclaimer, the term of this patent is extended or adjusted under 35 U.S.C. 154(b) by 118 days.

(21) Appl. No.: 13/077,633

(22) Filed: Mar. 31, 2011

(65) Prior Publication Data

US 2012/0254401 A1 Oct. 4, 2012

(51) Int. Cl.
*G06F 15/173* (2006.01)
(52) U.S. Cl.
USPC .......................................... 709/224; 709/227
(58) Field of Classification Search
None
See application file for complete search history.

(56) References Cited

U.S. PATENT DOCUMENTS

| 6,768,720 | B1 | 7/2004 | Kamstra et al. | |
|---|---|---|---|---|
| 8,094,565 | B2 * | 1/2012 | Schuringa et al. | ............ 370/241 |
| 2006/0155851 | A1 * | 7/2006 | Ma et al. | ........................ 709/226 |
| 2007/0115930 | A1 * | 5/2007 | Reynolds et al. | ............. 370/352 |
| 2007/0214241 | A1 | 9/2007 | Song et al. | |
| 2007/0288632 | A1 * | 12/2007 | Kanaparti et al. | ............ 709/224 |
| 2008/0101348 | A1 * | 5/2008 | Verkama et al. | .............. 370/356 |
| 2008/0165796 | A1 * | 7/2008 | Martinez et al. | .............. 370/458 |
| 2009/0319853 | A1 * | 12/2009 | Keyghobad et al. | .......... 714/749 |
| 2010/0315973 | A1 * | 12/2010 | Hirano et al. | .................. 370/254 |
| 2011/0110286 | A1 * | 5/2011 | Lu et al. | ........................ 370/312 |
| 2012/0122418 | A1 * | 5/2012 | Hicks, III | .................. 455/404.1 |
| 2012/0226768 | A1 * | 9/2012 | Gaines et al. | ................. 709/217 |

* cited by examiner

*Primary Examiner* — Ario Etienne
*Assistant Examiner* — Clayton R Williams
(74) *Attorney, Agent, or Firm* — S. Wyse

(57) ABSTRACT

A manner of extending a home network to a remote TMA service. A TMA in the TMA service acquires and stores a UID (unique identifier) and a MS-UID (monitoring service UID), than registers with an SG (signaling gateway) and is then redirected to an MA-SG (monitoring application SG). The MA-SG may be dedicated to the TMA service or may host communications for more than one service. When an HA that subscribes to the monitoring service registers, it is also redirected to the MA-SG, and a secure tunnel is established between the TMA and the HA and maintained by heartbeat messages. The secure tunnel may be redirected to an MA-PS (monitoring application proxy server) depending on the bandwidth consumed in the monitoring process and traffic conditions.

15 Claims, 4 Drawing Sheets

METHOD AND APPARATUS FOR HOME NETWORK ACCESS BY A TRUSTED MONITORING AGENT

CROSS-REFERENCE TO RELATED APPLICATIONS

The present invention is related to the U.S. patent application Ser. No. 12/985,730, entitled Method and Apparatus for Home Network Access, filed on 6 Jan. 2011, and U.S. patent application Ser. No. 12/986,706, entitled Method and Apparatus for Home Network Access Using a Remote Mobile Device, filed on 7 Jan. 2011, and U.S. patent application Ser. No. 13/075,920, entitled Method and Apparatus For Enhancing QoS During Home Network Remote Access, filed on 30 Mar. 2011. The entire contents of these Applications are incorporated by reference herein.

TECHNICAL FIELD

The present invention relates generally to the field of communication networks, and, more particularly, to a method and apparatus for facilitating remote access by a trusted monitoring agent to an in-home communication network.

BACKGROUND

Introductory information will here be provided. Note, however, that the apparatus, techniques, or schemes described herein as existing or possible are presented only as background for describing the present invention, and no admission is intended thereby that these were heretofore commercialized or known to others beside the inventors.

Selected abbreviations are herewith defined, at least some of which are referred to within the following description of the state-of-the-art and the present invention.
ASIC Application Specific Integrated Circuit
BSS Business Support Systems
CAC Call Admission Control
CRL Certificate Revocation List
DHCP Dynamic Host Configuration Protocol
DSL Digital Subscriber Line
DVR Digital Video Recorder
HA Home Agent
FA Foreign Agent
IEEE Institute of Electrical and Electronics Engineers
IP Internet Protocol
ISP Internet Service Provider
MA-SG Monitoring Application SG
MA-PS Monitoring Application PS
MS-UID Monitoring Service UID
NAT a Network Address Translation
OS Operating System
OSS Operations Support Systems
PC Personal Computer
PKI Public Key Infrastructure
PS Proxy Server
QoS Quality of Service
RG Residential Gateway
SG Signaling Gateway
TCP Transmission Control Protocol
UID Unique Identifier Consumer electronics have progressed a great deal in the recent past. Not only are they more capable than they were a short time ago, they are also far more prevalent. Many homes, for example, have more than one personal computer and video storage device, along with many similar devices. These devices are often connected together to form a network, and through the network are capable of communicating with other devices outside of the home. The use of email and telephone services that are available through such networks is very common, and the downloading of, for example, software applications and multimedia transmissions is becoming more frequent.

A home network benefits users in a number of ways. Even if there is no connection to others outside of the home, the home network allows a user to, for example, print from a printer that is not connected directly to the computer in use. Files such as documents, pictures, and videos may be retrieved or sent to another device within the home. Modem data storage units are capable of saving a large amount of audio or video data, and the network permits this content to be retrieved and played on any device connected to the network. Multiple users may participate in a game over the network.

Connections outside of the home are often facilitated by some type of device that serves as an interface to whatever network service is providing access. Such a device may take the form, for example, of a wireless router connecting multiple computers to the Internet, or a set-top box that receives video and television programming for display on a television or other video display device. Many if not most home networks are connected to an access network, which provides a link between a subscriber's home and a core network capable of handling large amounts of communication traffic and providing gateways for communicating through other networks as well.

When the home network is connected to an access network, communications such as email and Internet access are permitted; video and audio content may be downloaded. In addition, recent advances in technology have enlarged the amount of data that may be uploaded, or sent from the home network to others through the access network. In some cases, for example a movie or other video may be sent to another at nearly the speed at which it was downloaded, at least from the user's perception.

This may be of great advantage to the user of a mobile device. As used herein, a mobile device is one capable of accessing a mobile network using radio communications. Mobile devices are very popular because of their mobility; a user may conveniently carry the device with them and use it anywhere a mobile network may be contacted. Mobile network providers have signed up thousands of subscribers and built up networks that cover large geographic areas. In many locations, if a subscriber cannot access their own mobile network, they may use another network as a visitor. Mobile networks are often based on a cell system, where mobile devices communicate with a nearby base station and handover protocols allow them to travel from one cell (base station) to another without significant interruption of an on-going communication session.

A mobile subscriber at home may be able to access content and devices that are part of the home network, for example using a short range radio protocol such as Bluetooth. When the user is not at home, however, such access is not available, but the content may be accessible in a number of other ways. For example, content accessible via the home network may not actually be stored there, but is rather stored in a remote memory device maintained by a vendor. In other cases the content may be stored within the home network, but is copied or mirrored at a vendor's server for the purpose of providing mobile access. In either case, the user may access the content being stored by the vendor using a mobile device communicating though a mobile network.

There are disadvantages with this strategy, however. For one, storage on a vendor site may raise security concerns. In addition, the vendor may charge for the service and there is a risk that they may at some point become unavailable if their business fails. Finally, the sheer volume of content that users currently want to, and are projected to demand, may make this option less than viable in the future.

Access may also be possible directly to the home network though a mobile network using protocols such as MobileIP. In such an arrangement it is contemplated that the mobile device embodies a foreign agent (FA) that establishes a communication session with a home agent (HA) embodied on one of the devices that makes up the home network. Such a system may also be used to allow access by a TMA (trusted monitoring agent), which may be owned and operated by a monitoring service, which is typically not the subscriber or the communications network operator. Third-party monitoring services can be quite valuable, however. As one example, a security monitoring service may be used to monitor a home security system through the home network. As another example, a health monitoring service may monitor home patient-monitoring devices through the home network as well. In these and other cases, the TMA may be treated as an FA by MobileIP for the purpose of accessing the home network. Although this addresses some of the disadvantages associated with third party vendors, however, several disadvantages remain.

First, to communicate with the FA or TMA, the HA obtains an IP address. In general practice, however, this IP address will be dynamically assigned, meaning that he address is not assigned permanently but will eventually be re-assigned to another user. Of course, the HA can request another IP address, but when assigned it will almost certainly be different than the previous one. While the policy of dynamically assigning IP addresses conserves IP addresses and reduces the number ultimately required, it can disrupt routing between the FA (or TMA) and the HA and make it more difficult for the mobile device to register with its respective HA.

In addition, home networks frequently employ a residential gateway, with the HA being assigned a private IP address and being behind a NAT boundary. This also may help to conserve IP addresses, but may make it difficult for the FA or TMA to contact the HA and set up a secure tunnel for communications.

In the face of such difficulties, there is a need for a manner of facilitating secure access to a home network from a remote mobile station. Accordingly, there has been and still is a need to address the aforementioned shortcomings and other shortcomings associated with communications between a TMA service and an HA in a home network. These needs and other needs are satisfied by the present invention.

SUMMARY

The present invention is directed to a manner of facilitating access to a home network by a TMA service. In one aspect, the present invention is a method of providing access for a service comprising a TMA (trusted monitoring agent) to a home network comprising an HA (home agent) registered with an SG (signaling gateway), including acquiring and storing a UID (unique identifier) in the TMA, registering the TMA with an MA-SG (monitoring application signaling gateway), initiating a heartbeat between the TMA and the MA-SG. The method may also include acquiring and storing a MS-UID (monitoring service UID) in the TMA.

In some embodiments, registering the TMA with an MA-SG includes registering the TMA with an SG of the communications network, from which the communication session will be redirected to the MA-SG. The TMA may receive an allocation of ports for use, for example, with a hosted MA-SG, and the communication session may be redirected to a hosted MA-PS. When a subscribing HA associated with a home network registers, a monitoring session is established and the home network is monitored until for some reason terminated. If the quantity and frequency of monitoring-related transmissions permit, the heartbeat may be adjusted to reduce heartbeat traffic through the network. In some embodiments, if the TMA receives an alarm from the home network, an emergency call from a telephone in the home network may be initiated.

In another aspect, the present invention is software instructions stored in one or more tangible, non-transitory memory devices for performing any or all of the above operations when executed on a special purpose processor on a computing device such as a TMA, an SG, or a PS.

In another aspect, the present invention is a TMA for remotely monitoring at least one home network having an HA, the TMA including a processor, a memory device accessible to the processor, an HA register for maintaining a registry of HAs through which the at least one home network is being monitored, and a heartbeat message generator for generating heartbeat messages between the TMA and at least the HA of the at least one network. The TMA may also include a heartbeat adjuster for adjusting the frequency of heartbeat messages.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

The present invention is directed to a manner of facilitating access to a home network by a TMA service, and is of particular advantage when implemented in an environment where communication with the home network is limited by a dynamic connection point to the Internet and a NAT (network address translation) boundary.

Figure 1:
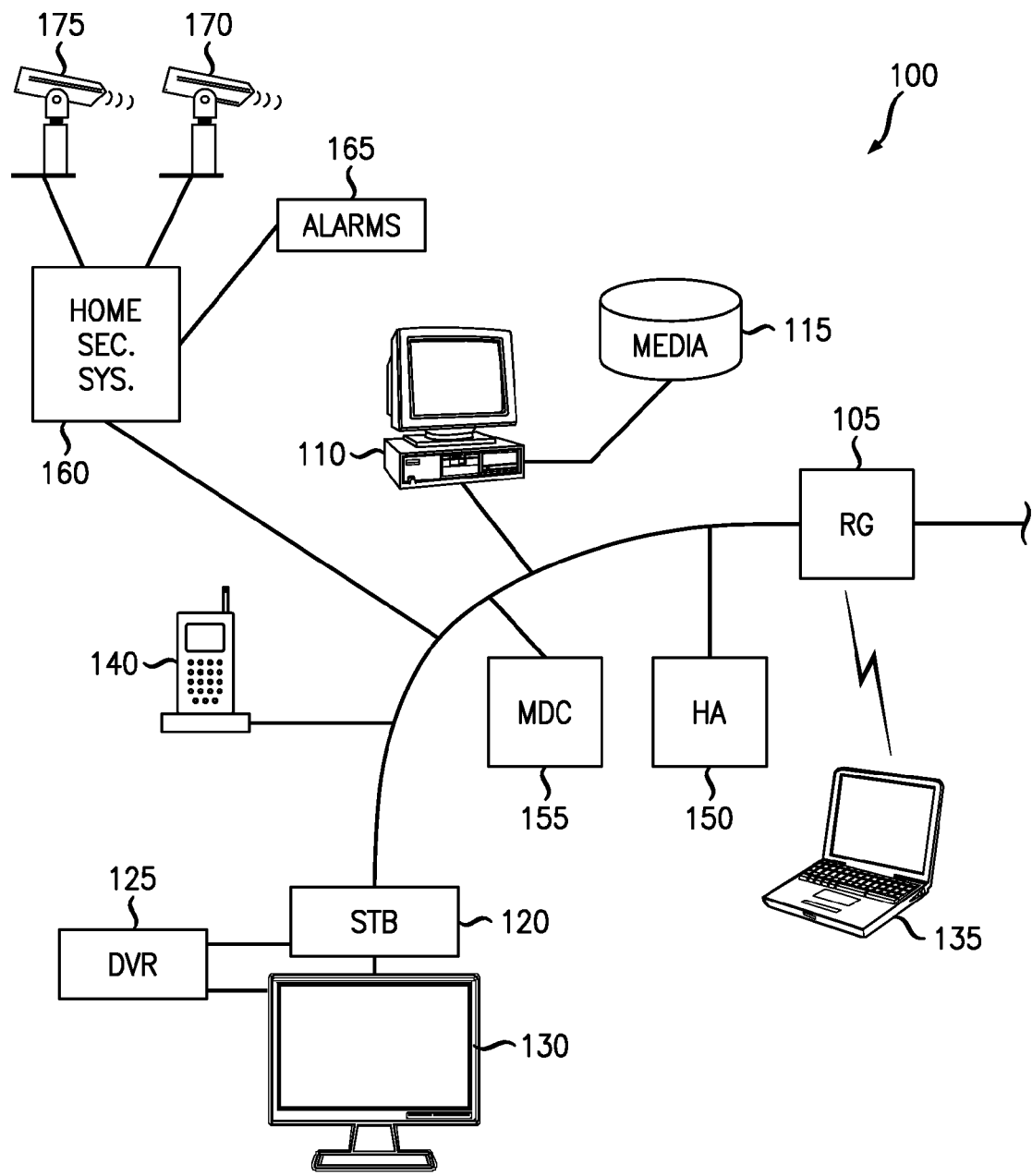
FIG. 1 is a simplified schematic diagram illustrating selected components of a home network according to an embodiment of the invention.

FIG. 1 is a simplified schematic diagram illustrating selected components of a home network 100 according to an embodiment of the invention. Note that the home network is so-called because the components used are suitable to acquisition and use in-home by a subscriber, but the same system could just as easily be installed in, for example, a small business, school, or church office setting. For convenience, such a network will be referred to as a home network regardless of whether it is installed in the residence of a single subscriber or in another location.

The various components of a home network could communicate only among themselves—within the home (or other installed location), but this is typically not the case. Communication with outside devices is often one of the reasons for which the home network was established. In the embodiment of FIG. 1, home network 100 includes an RG (residential gateway) 105. RG 105 facilitates communications between home network 100 and an access network (not shown in FIG. 1). The access network in turn provides a conduit to a core communication network and then to other networks and devices (see, for example, FIG. 2).

In the embodiment of FIG. 1, RG 105 may also act as a router to receive communications from outside and transmit them to the various components of network 100. In this embodiment, these components include a PC 110 and associated media storage device 115. Telephone service is also available through home network 100, as represented by telephone 140. A set-top box 120 is also part of home network 100 and is associated with DVR 125. In this embodiment, network 100 also includes a telephone 130 and laptop computer 135. As indicated in FIG. 1, many components of network 100 are connected by a cable to RG 105, while the laptop 135 uses a wireless interface. Of course, this particular combination of components, while not uncommon, is exemplary and other home networks may be configured differently.

In this embodiment, home network also includes an MDC (medical device controller) 155 that is used to connect health-related or patient medical devices to the home network. For example, a resident may wear or carry a heart monitor that monitors the patient's heartbeat, or an oxygen system may be monitored to make sure it is operational and, if necessary, contains a reserve of gaseous or liquid oxygen for patient use. While these devices often operate on their own, the connection to the home network can provide ample data storage, additional instructions that can be downloaded, and of course the connection to a remote device such as a TMA.

For similar reasons, this embodiment also includes a home security system controller 160 that is part of the home network. Home security system controller 160 may control and monitor alarms 165, which may include a plurality of sensors that detect motion or open doors, as well as possible smoke or fire or an overabundance of carbon monoxide. Cameras 170 and 175 may be deployed at strategic locations and relay a video image to home security system controller 160 for storage at, for example, media storage device 115. Microphones and speakers (not shown) may also be deployed and controlled by controller 160 or MDC 155, or both, for collecting ambient audio or speaking with a person not using a telephone.

In this embodiment, telephone 140 may also be configured to place telephone calls, such as 911 emergency calls, perhaps using messages that are pre-recorded or simulated. This may be useful, for example, if a fire is detected or an elderly patient activates a personal alert device. When a security or medical monitoring service is in communication with home network 100, it could also transmit such messages or even a live conversation with, for example, a remotely-located police officer, firefighter, or nurse communicating through the monitoring service.

In accordance with the present invention, home network 100 also includes an HA (home agent) 150, which has several functions that will be alluded to or described herein. HA 150 is typically implemented as a physical processor executing instructions stored as software in a non-transitory medium. In other embodiments, the HA may be implemented as a combination of executable software and hardware such as an ASIC. The HA may be a standalone device or incorporated in a multifunction apparatus that performs other duties as well. In some implementations it may, for example, be implemented in RG 105 or PC 110.

In accordance with this embodiment of the present invention, the HA 150 acquires a UID (unique identifier) that may be used for communication sessions involving FAs or TMAs authorized to access the home network. There are several ways in which this acquisition could be made; in one embodiment the HA simply generates its own UID, for example using the serial number of the processor. In another embodiment, the HA uses a UID in the OS (operating system). In either case, the UID acquisition scheme should insure the uniqueness of the UID. The UID may also be generated by another element, for example, one could be assigned when registering with an SG (signaling gateway; see for example FIG. 2). If generated by another element, the HA would preferably store it in encrypted form in an accessible memory device.

Figure 2:
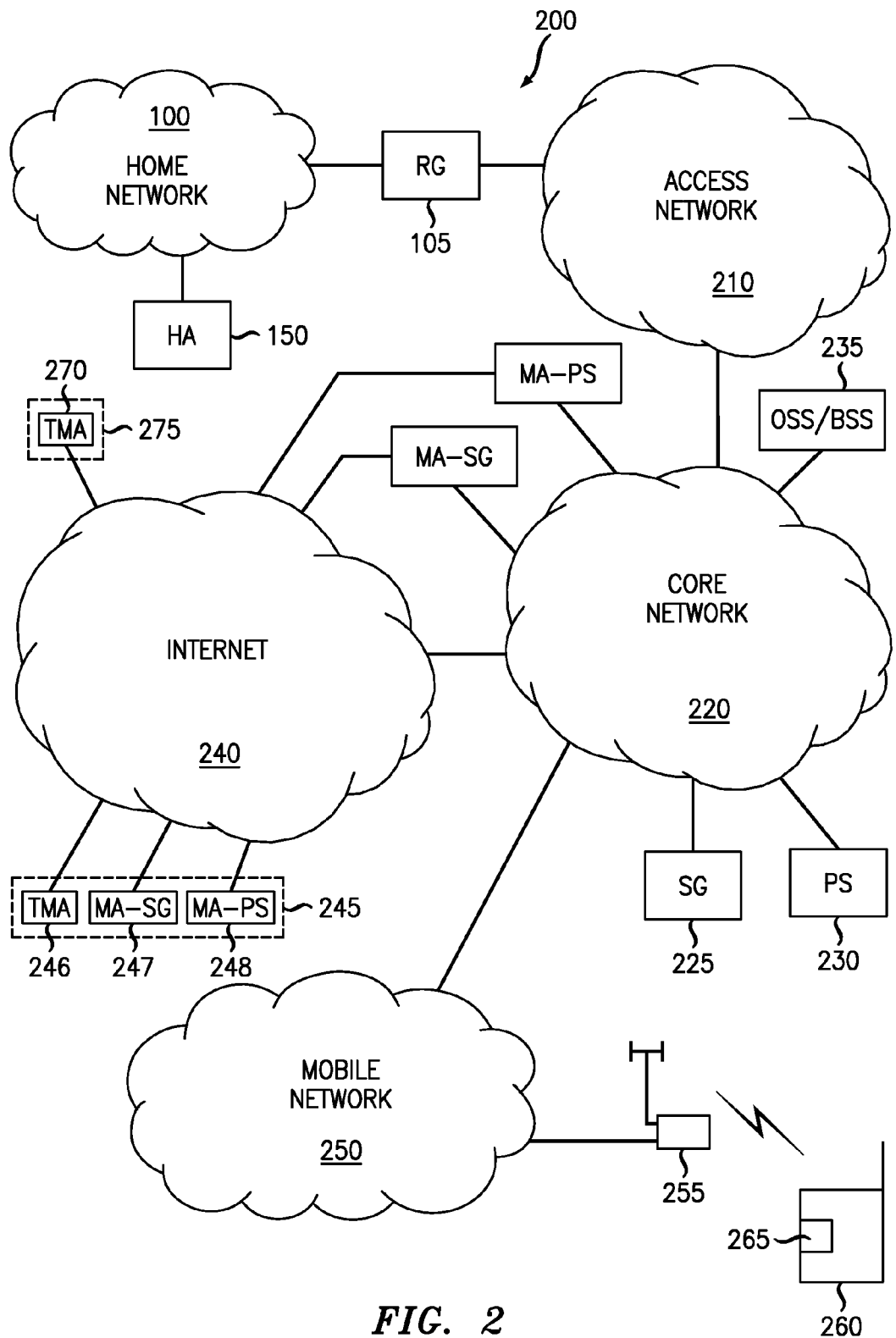
FIG. 2 is a simplified schematic diagram illustrating selected components of a communication network according to an embodiment of the present invention.

FIG. 2 is a simplified schematic diagram illustrating selected components of a communication network 200 according to an embodiment of the present invention. Note that communication network 200 actually includes several networks (or, more accurately, components within those networks, which components are not shown separately). For example, home network 100 is illustrated as a cloud (though shown in more detail in FIG. 1), except that HA 150 is also depicted in FIG. 2, as is RG 105. RG 105 connects the home network 100 to access network 210. Access network may, for example, be a DSL implementation in a PSTN or a PON (passive optical network). Access network 210 in turns provides a connection to core network 220. In general, core network 220 is a large capacity packet data network that routes communications between many different entities, including home network 100 via access network 210.

In this embodiment, for example, the core network 220 is in communication with the Internet 240, providing home network 100 with Internet access. Again, there may be one or more gateway devices used at the interface, though for simplicity these components are not shown individually in FIG. 2. Separately shown, however, are signaling gateway (SG) 225 and proxy server (PS) 230. Each (or both) of these devices could be software executing on a single physical unit or could be implemented using multiple physical devices working cooperatively. The operation of these components in accordance with the present invention will be described below.

An OSS/BSS (operations support system/business support system) 235 is also illustrated separately in FIG. 2. The OSS/BSS 235 is a network control system that may perform several functions, including maintenance, configuration and fault management, as well supporting subscription and billing services. The processes and apparatus of the present invention interact with the OSS/BSS 235 in at least some embodiments.

In the embodiment of FIG. 2, core network 220 is also connected to mobile network 250. Mobile network 250 typically includes a number of geographically dispersed base stations, each with their own antenna, for communicating with mobile devices in their local area. Antenna/base station 255 is depicted for purposes of illustration. Antenna/base station 255 may include, for example, an eNodeB. Mobile device 260 is also shown and is capable of radio communications with antenna/base station 255 to set up a communication session through mobile network 250. Although only one is shown, a mobile network ordinarily includes a large number of antenna/base stations and employs a protocol for handing over a communication session from one antenna/base station to another when the mobile device relocates.

In this embodiment of the present invention, mobile device 260 includes a FA (foreign agent) 265, which may register with HA 150 in order to access home network 100. In accordance with the present invention a secure communication path, or tunnel, is established between FA 265 of mobile device 260 and HA 150 of home network 100 though SG 225. An example of this process is described in U.S. patent application Ser. No. 12/985,730, referred to above. A similar though not identical process may be used in registering and communicating with a TMA (trusted monitoring agent) such as TMA 246 or TMA 270, which are operated by TMA services 245 and 275, respectively. TMA services 245 and 275 are accessible via Internet 240.

In the embodiment of FIG. 2, each TMA is associated with its respective monitoring service. Each TMA, such as TMA 246 or TMA 270 is typically implemented as a physical processor executing instructions stored as software in a non-transitory medium. In other embodiments, the TME may be implemented as a combination of executable software and hardware such as an ASIC. The TMA may be a standalone device or incorporated in a multifunction apparatus that performs other duties as well. Although each monitoring service 245 and 275 are shown in FIG. 2 to each have a single TMA, in some implementations a service may have multiple TMAs working together.

In this embodiment, monitoring service 245 also includes MA-SG (monitoring application SG) 247 and MA-PS (monitoring application PS) 248. Each of these devices serves a similar though not necessarily identical function to SG 225 and PS 230, which are part of the core network 220, but MA-SG 247 and MA-PS 248 shown here are dedicated to use in monitoring applications. Each of MA-SG 247 and MA-PS 248 have a public IP address and communicate through Internet 240, as does TMA 246, though they are owned by the service 245 and housed at the same site.

As should be apparent, monitoring service 275 of FIG. 2 does not include and MA-SG or MA-PS. This may be a smaller service that has made a smaller capital investment in hardware. In this embodiment, therefore, service 275 relies on using hosted services to perform the functions of the MA-SG and the MA-PS. These services may be hosted, for example, by MA-SG 280 and MA-PS 285, which are part of the core network 220 and are owned and operated by the network operator for this purpose. In other embodiments, hosted services may be supplied by MA-SG 247 and MA-PS 248 of service 245, or even by SG 225 and PS 230 (assuming a publicly accessible IP address and connection to the Internet (not shown in FIG. 2)).

In the embodiment of FIG. 2, wherever the services are hosted, provision in the PS must be made to allocate a specific port range for a given monitoring service. These may, for example, be accomplished in OSS/BSS 235, or another OSS with which the PS interacts. In one implementation, the network operator may host these monitoring services on a tiered basis, with capacity, QoS, and rates varying from one tier to another. The network operator may also wish to offer monitoring services on a subscription basis directly to consumers.

Figure 3:
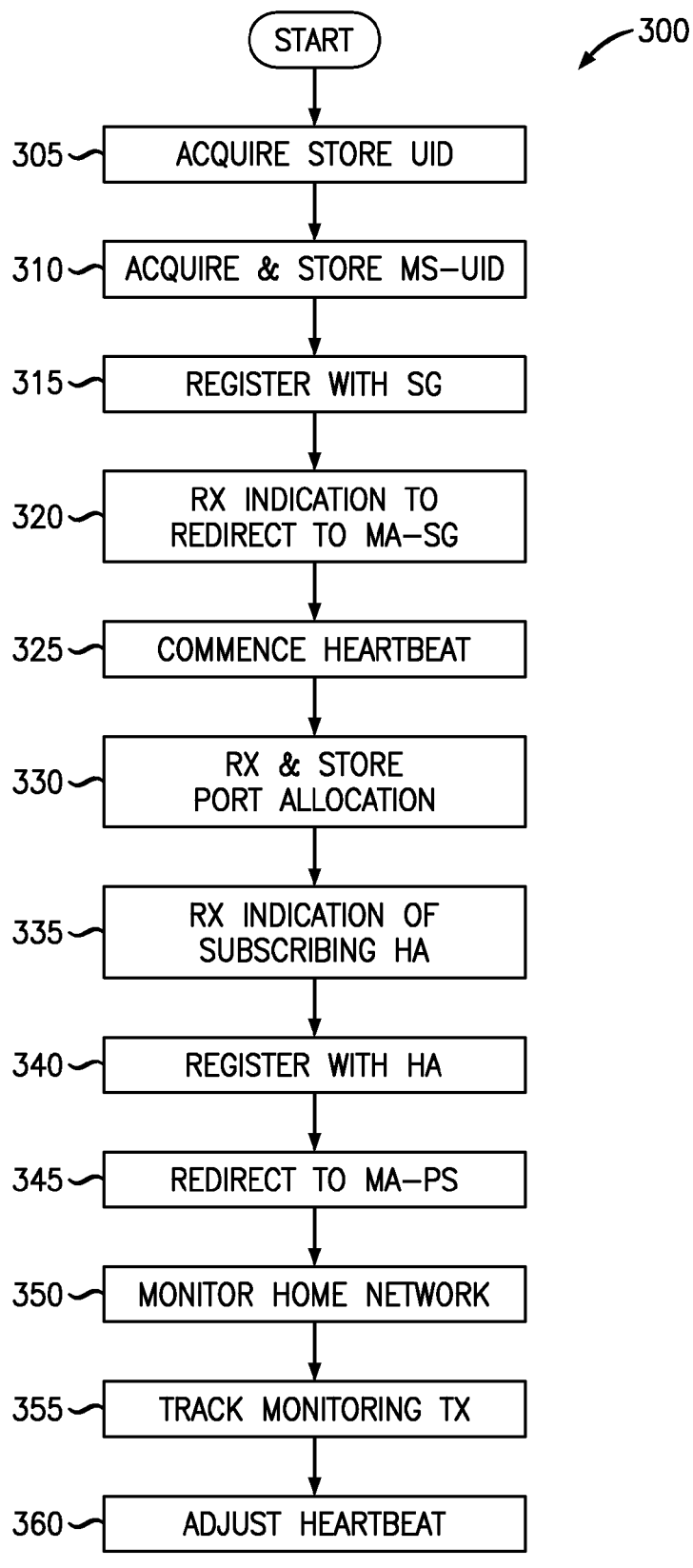
FIG. 3 is a flow diagram illustrating a method according to an embodiment of the present invention.

Initiation of the monitoring service will now be described with reference to FIG. 3. FIG. 3 is a flow diagram illustrating a method 300 according to an embodiment of the present invention. At START it is presumed that the components necessary to performing the method are available and operational according to the present invention. The process then begins with the acquisition of a UID for the TMA (step 305). The TMA UID may be generated in the TMA itself, for example using the serial number of the processor or a unique identifier that is already installed in the TMA operating system. The UID could also be provided to the TMA by another element, for example an SG during TMA registration. The acquired UID is then stored (not separately shown), preferably in encrypted form in a storage location at or accessible to the TMA.

In this embodiment, an MS-UID is also acquired (step 310). The MS-UID is uniquely associated with the monitoring service with which the TMA will engage in, and may be assigned by an OSS/BSS or some other entity associated with a communications network. The acquired MS-UID is also then stored (not separately shown), preferably in encrypted form in a storage location at or accessible to the TMA.

In the embodiment of FIG. 3, the TMA then registers (step 315) with an SG associated with a communication network. At registration, the TMA presents the MS-UID to the SG, and preferably executes an authentication protocol. The authentication protocol preferably includes a two-way certificate validation between the TMA and the SG. The Public Key Infrastructure (PKI) and certificate templates are preferably configured in a manner where the certificates derive from a trusted party (for example, a common root or intermediate certificate authority), and also include checks to a Certificate Revocation List should any certificate authority become compromised. Note, however, the exact protocol used for authentication will vary from one implementation to another; and no particular authentication method is required by the present invention unless explicitly recited in a particular embodiment.

Note that in some embodiments, a UID for the TMA will be provided to the TMA by the SG as part of the registration process (or by the MA-SG after step 320); in others, such as where the UID is generated or previously installed in the TMA, it may be provided to the SG during registration.

In the embodiment of FIG. 3, once registration is completed, the TMA will receive an indication that the SG has redirected monitoring communications to a dedicated MA-SG (step 320). At this point, heartbeat between the TMA and the MA-SG is commenced (step 325). A heartbeat is a small message periodically transmitted from one device to another, which then transmits an acknowledgement. In this manner an opening in the NAT boundary is preserved so that, following any lengthy pause in communication registration does not have be repeated. Note that there may but not necessarily be a NAT boundary associated with the monitoring service. The heartbeat may of course be omitted at this stage if it is not necessary.

In this embodiment, the TMA then receives and stores port allocations (step 330), if any, associated with a MA-PS through which the monitoring services will be transmitted through a secure tunnel. These port allocations are most necessary if the monitoring is hosted by a MA-SG and MA-PS that may host other monitoring services as well. They may not be needed or used when a dedicated MA-SG and MA-PS (that is, which are uniquely associated with the TMA monitoring service).

In the embodiment of FIG. 3, the TMA then receives an indication (step 335) that an HA associated with a monitoring service subscriber has registered with the MA-SG. Although not shown, this may involve the HA registering with an SG associated with a communications network, which recognizes that the HA is a subscribing HA to a particular monitoring service (or to more than one). This recognition may come from a lookup with the OSS/BSS during registration. When this occurs, the HA is directed to fork the session, and the monitoring fork is redirected to the MA-SG. (The HA also maintains communication with the primary SG, for example so that an FA may remotely access the home network.)

In this embodiment, when the HA is directed to the MA-SG, a registration process is executed (step 340). During registration, the TMA and the HA may exchange their respective UIDs (and MS-UID), or execute further authentication protocols. A secure tunnel is also set up to connect the TMA and the HA through the MA-SG, and a heartbeat is initiated between the two entities (not separately shown). At this point the heartbeat is preferably exchanged between the TMA and the HA.

In the embodiment of FIG. 3, once registration is accomplished the monitoring communication session is directed to an MA-PS, and the secure tunnel is preferably transferred (step 345) without the need for any further registration or authentication. Note, however, that the transfer occurs primarily due to the fact that monitoring may involve the need for higher bandwidth, and the MA-SG should not be overloaded. In some cases, monitoring involves only a low bandwidth, such as when it involves only polling a home network device, or transmitting a periodic report to the TMA. For this reason, transfer to the MA-PS may still be done but is not mandatory, at least until the resource demands increase or the traffic load on the MA-SG increases. In either case, the monitoring service can now commence (step 350), and the TMA monitors the home network until the service is for some reason terminated (not shown).

Note that the TMA may, and probably will interface in this fashion with many HAs, as the service may monitor many home networks at the same time. The initiation procedure will be similar for each HA, so only one process is described in FIG. 3. Note also that the OSS/BSS may send out subscription updates, for example periodically or when a new subscription is undertaken. This may result in the monitoring service for one or more HAs being terminated, or new ones added for the TMA.

In the embodiment of FIG. 3, the TMA also monitors the monitoring-related transmissions to and from the home network (step 355). If they are frequent enough, the NAT boundary or boundaries may be kept open by the monitoring transmissions, and the heartbeat frequency may be delayed or otherwise adjusted (step 360) to reduce heartbeat traffic when it is not needed. As should be apparent, provision must be made as well to resume the heartbeat when the monitoring transmissions are occurring with insufficient frequency.

The process of method 300 then continues with the acceptance or termination of additional monitoring sessions. The process should not have to be repeated from the beginning unless communication between the TMA and MA-SG or MA-PS is somehow interrupted, for example by an equipment outage or failure to properly receive a heartbeat transmission.

Note that the sequence of operations presented in FIG. 3 is exemplary, and the present invention is not limited to the illustrated embodiment. Additional operations may be added, or in some cases removed, without departing from the spirit of the invention. In additional the operations of the illustrated methods may be performed in any logically-consistent order.

Figure 4:
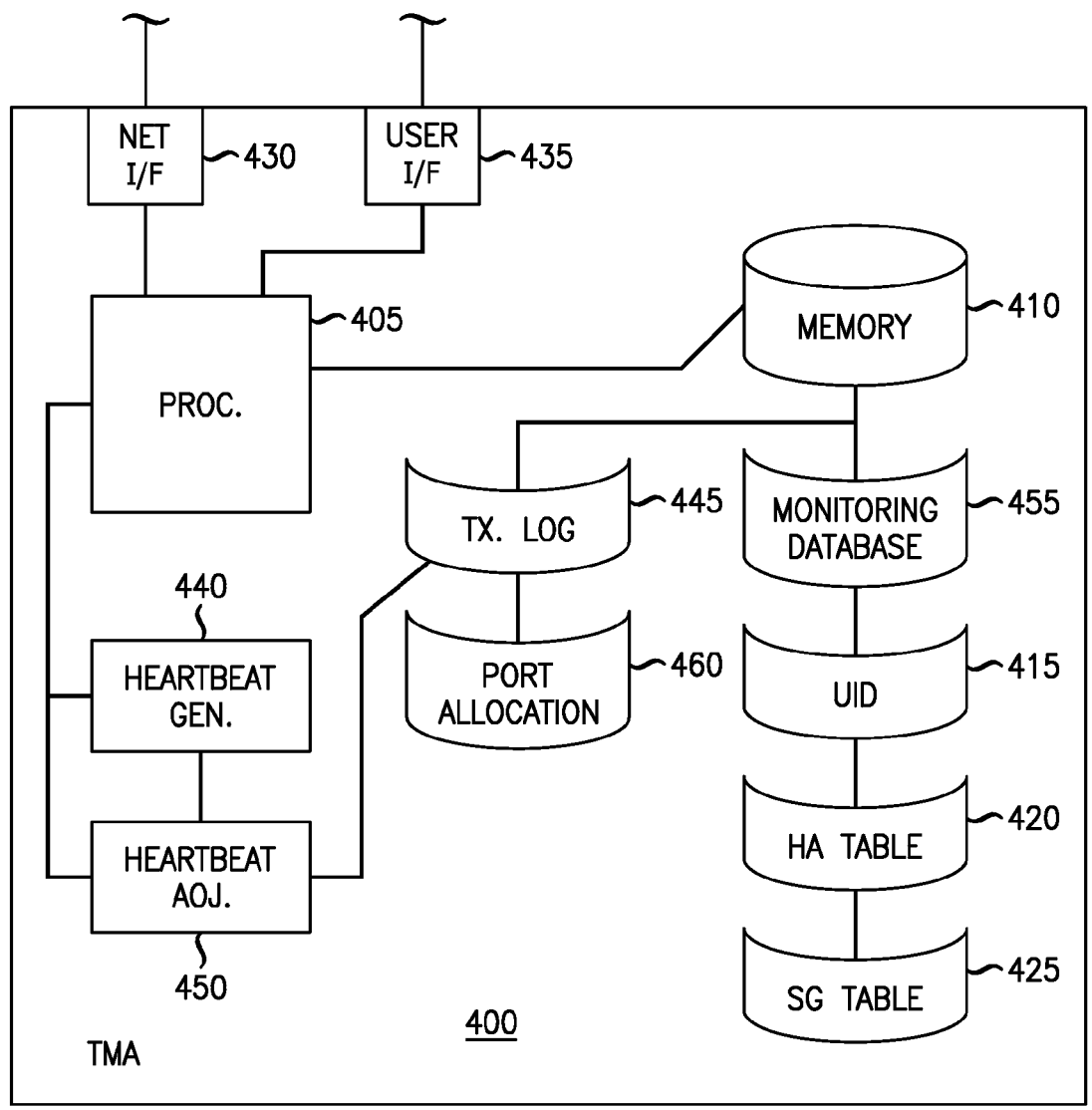
FIG. 4 is a simplified schematic diagram illustrating selected components of an TMA according to an embodiment of the present invention.

FIG. 4 is a simplified schematic diagram illustrating selected components of an TMA 400 according to an embodiment of the present invention. In this embodiment, the TMA 400 includes a processor 405 for controlling the other components of TMA 400 and a memory device 410, which stores both data and program instructions for controlling the TMA 400. Memory device, as used herein, connotes a physical, non-transitory apparatus. Shown separately is a UID memory device 415 for storing the UID of the TMA and the MS-UID of the monitoring service, as they are acquired, preferably in encrypted form. An HA registration table 420 maintains a registry of HAs that have registered with TMA 400, including their respective UIDs and authentication certificates if available and desired. HA registration table 420 may also store details regarding the particular monitoring service being performed. An SG table 425 maintains a registry of SG addresses and security information for contacting an SG to register and to set up a secure tunnel for remote mobile device communication sessions when granting remote access. Records collected during monitoring, if any, may be stored in monitoring database 455. Any port allocations are stored in port allocation database 460.

In this embodiment, TMA 400 also includes a network interface 430 for interfacing with Internet, and a user interface 435 for interacting with one or more users, if any, that become involved in the monitoring operation. User interface 435 may be connected to, for example, a keyboard and a display screen or microphone and speakers (not shown) for this purpose. A heartbeat generator 440 generates heartbeat messages to maintain TCP flow between the TMA 400 and the MA-SG or the various HAs following registration. A monitoring transmission log 445 and heartbeat adjuster 450 are also present in this embodiment for permitting the heartbeat frequency to be adjusted if possible.

Note that TMA 400 is an exemplary embodiment and other embodiments of the present invention are possible. For example, some of the components of TMA 400 may be combined together in other embodiments, or further subdivided if appropriate. In addition, TMA 400 may be implemented in a standalone physical device or incorporated into one of the other monitoring service elements.

In this manner the present invention facilitates access to a home network using an HA by a remote TMA device. A secure tunnel may be established between the TMA and an MA-SG, and linked with a secure tunnel between the HA and the MA-SG, with the secure tunnel being transferred to an MA-PS if conditions warrant.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. A method of providing home network access across a NAT (network address translation) boundary for a remote monitoring service associated with a TMA (trusted monitoring agent), the method comprising:

registering a subscribing HA (home agent) of a home network with a SG (signaling gateway) to establish a communication session;

acquiring an UID (unique identifier) for the TMA;

registering the TMA with an MA-SG (monitoring application signaling gateway);

initiating a heartbeat between the TMA and the MA-SG;

receiving an indication that the subscribing HA subscribes to the remote monitoring service associated with the TMA;

directing the HA to fork the communication session with the SG into a monitoring fork;

redirecting the monitoring fork of the communication session with the SG in the direction of the MA-SG;

establishing a monitoring fork tunnel of the monitoring fork that connects the TMA and the HA through the MA-SG; and monitoring via the monitoring fork tunnel at least one device of the home network associated with the HA.

2. The method of claim 1, further comprising acquiring a MS-UID (monitoring service UID) in the TMA.

3. The method of claim 2, further comprising encrypting and storing the UID and the MS-UID by the TMA.

4. The method of claim 2, further comprising registering the MS-UID with an OSS/BSS of a communications network.

5. The method of claim 1, wherein registering the TMA with an MA-SG comprises registering the TMA with an SG of the communications network.

6. The method of claim 5, wherein registration with the SG comprises an authentication procedure.

7. The method of claim 1, wherein the MA-SG is a part of the same monitoring service as the TMA.

8. The method of claim 1, wherein the MA-SG is a hosting MA-SG.

9. The method of claim 6, wherein the hosting MA-SG is part of a monitoring service different than the monitoring service associated with the TMA.

10. The method of claim 6, further comprising receiving in the TMA an allocation of ports associated with the service.

11. The method of claim 1, wherein the at least one device of the home network is a medical device controller.

12. The method of claim 1, wherein the at least one device of the home network is a home security system controller.

13. The method of claim 1, further comprising initiating a heartbeat between the TMA and the HA.

14. The method of claim 13, further comprising monitoring messages between the TMA and the HA and suspending a heartbeat when recent message traffic is sufficient to maintain an opening in the NAT boundary or boundaries, if any, associated with the remote monitoring service and the home network.

15. The method of claim 1, further comprising receiving an alarm from the home network and initiating an emergency call from a telephone in the home network.

* * * * *